United States Patent
Kakishima

(10) Patent No.: US 12,170,920 B2
(45) Date of Patent: Dec. 17, 2024

(54) METHOD FOR CONTROLLING NETWORK SLICE, INFORMATION PROCESSING APPARATUS, AND SYSTEM

(71) Applicant: INTERNET INITIATIVE JAPAN INC., Tokyo (JP)

(72) Inventor: Jun Kakishima, Tokyo (JP)

(73) Assignee: INTERNET INITIATIVE JAPAN INC., Tokyo (JP)

(*) Notice: Subject to any disclaimer, the term of this patent is extended or adjusted under 35 U.S.C. 154(b) by 0 days.

(21) Appl. No.: 18/514,682

(22) Filed: Nov. 20, 2023

(65) Prior Publication Data
US 2024/0357411 A1    Oct. 24, 2024

(30) Foreign Application Priority Data

Apr. 18, 2023    (JP) .................. 2023-067708

(51) Int. Cl.
*H04W 28/02*    (2009.01)
*H04W 8/20*     (2009.01)

(52) U.S. Cl.
CPC ......... *H04W 28/0226* (2013.01); *H04W 8/20* (2013.01)

(58) Field of Classification Search
CPC ........................... H04W 8/20; H04W 28/0226
See application file for complete search history.

(56) References Cited

U.S. PATENT DOCUMENTS

2020/0389835 A1*  12/2020  Talebi Fard ........ H04W 48/06
2021/0194771 A1    6/2021  Sridhar et al.
2023/0081673 A1*   3/2023  Junkins ............... H04L 41/5067
                                                          370/235
2023/0379764 A1*  11/2023  Zhu ....................... H04W 28/24

FOREIGN PATENT DOCUMENTS

WO    2020/152954 A1    7/2020

OTHER PUBLICATIONS

"3rd Generation Partnership Project: Technical Specification Group Services and System Aspects; System architecture for the 5GSystem (5GS); (Release 18) Stage2" and 3GPP TS 23.201, V18.1.0 (Mar. 2023), Apr. 5, 2023, 13 on p. 277-279, the Internet<URL: https://www.3gpp.org/ftp/Specs/archive/23_series/23.501/23501-i10.zip>.

* cited by examiner

*Primary Examiner* — Khoa Huynh
(74) *Attorney, Agent, or Firm* — MICHAEL BEST & FRIEDRICH LLP

(57) ABSTRACT

A problem to be solved is to control a network slice from a core network. A method to be executed by an information processing apparatus in a cloud-based computing environment includes the steps of: receiving, from a mobility management device, a congestion notification including a slice identifier for a congested slice; transmitting, to a slice allocation device, a setting request for setting a subslice to the slice corresponding to the slice identifier, upon reception of the congestion notification; and transmitting, when a subslice identifier associated with the slice identifier is set in the slice allocation device and the subslice identifier is added in the mobility management device, an instruction to establish communication using the subslice corresponding to the subslice identifier and the slice corresponding to the slice identifier to the mobility management device.

14 Claims, 14 Drawing Sheets

| CLIENT INFORMATION (CLIENT MANAGEMENT DEVICE) | | |
|---|---|---|
| SUBSCRIBER IDENTIFICATION NUMBER | SLICE LIST IDENTIFIER | SLICE IDENTIFIER |
| ****1 | S-NSSAI list (#1) | S-NSSAI(#1) |
| | | S-NSSAI(#2) |
| | | S-NSSAI(#3) |
| ****2 | S-NSSAI list (#2) | S-NSSAI(#1) |
| | | S-NSSAI(#2) |
| ****3 | S-NSSAI list (#3) | S-NSSAI(#1) |
| | | S-NSSAI(#3) |
| ****4 | S-NSSAI list (#4) | S-NSSAI(#3) |
| ... | ... | ... |

| TAI | S-NSSAI MANAGEMENT INFORMATION (SLICE ALLOCATION DEVICE) | | |
|---|---|---|---|
| | SLICE LIST IDENTIFIER | SLICE IDENTIFIER (MAIN) | SLICE IDENTIFIER (SUB) |
| TAI (#1) | S-NSSAI list (#1) | S-NSSAI(#1) | NULL |
| | | S-NSSAI(#2) | NULL |
| | | S-NSSAI(#3) | NULL |
| | S-NSSAI list (#2) | S-NSSAI(#1) | NULL |
| | | S-NSSAI(#2) | NULL |
| | S-NSSAI list (#3) | S-NSSAI(#1) | NULL |
| | | S-NSSAI(#3) | NULL |
| | S-NSSAI list (#4) | S-NSSAI(#3) | NULL |
| --- | --- | --- | --- |
| TAI (#N) | | | |

Fig. 5

| SUBSCRIBER PROFILE INFORMATION (SUBSCRIBER DATA MANAGEMENT DEVICE) ||  |
|---|---|---|
| SUBSCRIBER IDENTIFICATION NUMBER | PHONE NUMBER | SLICE LIST IDENTIFIER |
| **1 | 090--** | S-NSSAI list (#1) |
| **2 | 090--** | S-NSSAI list (#2) |
| **3 | 090--** | S-NSSAI list (#3) |
| **4 | 090--** | S-NSSAI list (#4) |

| SUBSCRIBER NETWORK SLICE INFORMATION (MOBILITY MANAGEMENT DEVICE) | | | | |
|---|---|---|---|---|
| SUBSCRIBER IDENTIFICATION NUMBER | TAI | SLICE IDENTIFIER (MAIN) | SLICE IDENTIFIER (SUB) | CONGESTION INFORMATION |
| ****1 | TAI(#1) | S-NSSAI(#1) | NULL | NULL |
|  |  | S-NSSAI(#2) | NULL | NULL |
|  |  | S-NSSAI(#3) | NULL | NULL |
| ****2 | TAI(#1) | S-NSSAI(#1) | NULL | NULL |
|  |  | S-NSSAI(#2) | NULL | NULL |
| ****3 | TAI(#1) | S-NSSAI(#1) | NULL | NULL |
|  |  | S-NSSAI(#3) | NULL | NULL |
| ****4 | TAI(#1) | S-NSSAI(#3) | NULL | NULL |
| --- | --- | --- | --- | --- |
|  | TAI(#N) |  | NULL | NULL |

| SUBSCRIBER IDENTIFICATION NUMBER | SUBSCRIBER NETWORK SLICE INFORMATION (AMF) | | | |
|---|---|---|---|---|
| | TAI | SLICE IDENTIFIER (MAIN) | SLICE IDENTIFIER (SUB) | CONGESTION INFORMATION |
| ****1 | TAI(#1) | S-NSSAI(#1) | NULL | Y |
| | | S-NSSAI(#2) | NULL | Y |
| | | S-NSSAI(#3) | NULL | N |
| ****2 | TAI(#1) | S-NSSAI(#1) | NULL | Y |
| | | S-NSSAI(#2) | NULL | N |
| ****3 | TAI(#1) | S-NSSAI(#1) | NULL | N |
| ****4 | TAI(#1) | S-NSSAI(#3) | NULL | N |
| ... | ... | ... | ... | ... |
| | TAI(#N) | | NULL | NULL |

Fig. 9

| TAI | S-NSSAI MANAGEMENT INFORMATION (NSSF) | | |
|---|---|---|---|
| | SLICE LIST IDENTIFIER | SLICE IDENTIFIER (MAIN) | SLICE IDENTIFIER (SUB) |
| TAI (#1) | S-NSSAI list (#1) | S-NSSAI(#1) | S-NSSAI #1' |
| | | S-NSSAI(#2) | S-NSSAI #2' |
| | | S-NSSAI(#3) | NULL |
| | S-NSSAI list (#2) | S-NSSAI(#1) | S-NSSAI #1' |
| | | S-NSSAI(#2) | NULL |
| | S-NSSAI list (#3) | S-NSSAI(#1) | NULL |
| | | S-NSSAI(#3) | NULL |
| | S-NSSAI list (#4) | S-NSSAI(#3) | NULL |
| --- | --- | --- | --- |
| TAI (#N) | | | |

| SUBSCRIBER IDENTIFICATION NUMBER | SUBSCRIBER NETWORK SLICE INFORMATION (AMF) ||||
|---|---|---|---|---|
| | TAI | SLICE IDENTIFIER (MAIN) | SLICE IDENTIFIER (SUB) | CONGESTION INFORMATION |
| ****1 | TAI(#1) | S-NSSAI(#1) | S-NSSAI(#1') | Y |
| | | S-NSSAI(#2) | S-NSSAI(#2') | Y |
| | | S-NSSAI(#3) | NULL | N |
| ****2 | TAI(#1) | S-NSSAI(#1) | S-NSSAI(#1') | Y |
| | | S-NSSAI(#2) | NULL | N |
| ****3 | TAI(#1) | S-NSSAI(#1) | NULL | N |
| ****4 | TAI(#1) | S-NSSAI(#3) | NULL | N |
| ... | ... | ... | ... | ... |
| | TAI(#N) | | NULL | NULL |

| SUBSCRIBER IDENTIFICATION NUMBER | SUBSCRIBER NETWORK SLICE INFORMATION (AMF) |||||
|---|---|---|---|---|---|
| | TAI | SLICE IDENTIFIER (MAIN) | SLICE IDENTIFIER (SUB) | MAIN CONGESTION INFORMATION | SUBSLICE DELETABLE INFORMATION |
| ****1 | TAI(#1) | S-NSSAI(#1) | S-NSSAI(#1') | Y | Y |
| | | S-NSSAI(#2) | S-NSSAI(#2') | Y | N |
| | | S-NSSAI(#3) | NULL | N | --- |
| ****2 | TAI(#1) | S-NSSAI(#1) | S-NSSAI(#1') | Y | N |
| | | S-NSSAI(#2) | NULL | N | |
| ****3 | TAI(#1) | S-NSSAI(#1) | NULL | N | |
| ****4 | TAI(#1) | S-NSSAI(#3) | NULL | N | |
| --- | --- | --- | --- | --- | --- |
| | TAI(#N) | | NULL | NULL | |

| TAI | S-NSSAI MANAGEMENT INFORMATION (NSSF) ||| 
|---|---|---|---|
| | S-NSSAI LIST IDENTIFIER | SLICE IDENTIFIER (MAIN) | SLICE IDENTIFIER (SUB) |
| TAI (#1) | S-NSSAI list (#1) | S-NSSAI(#1) | S-NSSAI # 1' (DELETABLE) |
| | | S-NSSAI(#2) | S-NSSAI # 2' |
| | | S-NSSAI(#3) | NULL |
| | S-NSSAI list (#2) | S-NSSAI(#1) | S-NSSAI # 1' |
| | | S-NSSAI(#2) | NULL |
| | S-NSSAI list (#3) | S-NSSAI(#1) | NULL |
| | | S-NSSAI(#3) | NULL |
| | S-NSSAI list (#4) | --- | --- |
| TAI (#N) | | | |

| SUBSCRIBER IDENTIFICATION NUMBER | SUBSCRIBER NETWORK SLICE INFORMATION (AMF) ||||
| --- | --- | --- | --- | --- |
| | TAI | SLICE IDENTIFIER (MAIN) | SLICE IDENTIFIER (SUB) | CONGESTION INFORMATION |
| ****1 | TAI(#1) | S-NSSAI(#1) | - | Y |
| | | S-NSSAI(#2) | S-NSSAI(#2') | Y |
| | | S-NSSAI(#3) | NULL | N |
| ****2 | TAI(#1) | S-NSSAI(#1) | S-NSSAI(#1') | Y |
| | | S-NSSAI(#2) | NULL | N |
| ****3 | TAI(#1) | S-NSSAI(#1) | NULL | N |
| | | S-NSSAI(#3) | NULL | N |
| ****4 | TAI(#1) | S-NSSAI(#3) | NULL | N |
| --- | --- | --- | --- | --- |
| | TAI(#N) | | NULL | NULL |

# METHOD FOR CONTROLLING NETWORK SLICE, INFORMATION PROCESSING APPARATUS, AND SYSTEM

TECHNICAL FIELD

The present disclosure relates to a method for controlling a network slice, an information processing apparatus, and a system.

BACKGROUND ART

One of 5G functions provided in a Stand Alone (SA) configuration using 5G core (5GC) is network slicing. NPL 1 specifies such a network slicing function. Network slicing is a technique in which functions of a network are divided into functions, such as eMBB for application for user terminal applications and URLLC for automatic driving assist, depending on an intended use, and a virtual network optimized for each purpose, such as use for user terminal applications or use for automatic driving assist, is operated as a slice. In this technique, a plurality of logical paths can be set and different QoSs can be set for the paths.

CITATION LIST

Non Patent Literature

NPL 1: 3GPP TS 123.502 V15.2.0, "5G; Procedures for the 5G system (3GPP TS 23.502 version 15.2.0 Release 15)"

SUMMARY OF INVENTION

Technical Problem

Heretofore, as illustrated in "FIG. 4.2. 2.2 3-1: Registration with AMF re-allocation procedure" in NPL 1, network slices have been managed in response to a request from a user terminal. This configuration makes it difficult to manage network slices depending on the increase or decrease in traffic in a base station even when the base station connected to the user terminal is congested.

An object of the present invention is to control a network slice. More particularly, an object of the present invention is to control a network slice from a core network upon detection of a congestion in the network slice.

Solution to Problem

To solve the above-described problems, an aspect of the present disclosure is a method to be executed by an information processing apparatus in a cloud-based computing environment, the method including the steps of: receiving a congestion notification including a slice identifier for a congested slice from a mobility management device; transmitting, to a slice allocation device, a setting request for setting a subslice to the slice corresponding to the slice identifier, upon reception of the congestion notification; and transmitting, when a subslice identifier associated with the slice identifier is set in the slice allocation device and the subslice identifier is added in the mobility management device, an instruction to establish communication using the subslice corresponding to the subslice identifier and the slice corresponding to the slice identifier to the mobility management device.

To solve the above-described problems, an aspect of the present disclosure is an information processing apparatus in a cloud-based computing environment, including: at least one processor; and a memory storing instructions for causing the information processing apparatus to execute, when executed by the at least one processor, the steps of: receiving a congestion notification including a slice identifier for a congested slice from a mobility management device; transmitting, to a slice allocation device, a setting request for setting a subslice to the slice corresponding to the slice identifier, upon reception of the congestion notification; and transmitting, when a subslice identifier associated with the slice identifier is set in the slice allocation device and the subslice identifier is added in the mobility management device, an instruction to establish communication using the subslice corresponding to the subslice identifier and the slice corresponding to the slice identifier to the mobility management device.

To solve the above-described problems, an aspect of the present disclosure is a system including: an information processing apparatus in a cloud-based computing environment; a mobility management device; and a slice allocation device, in which the information processing apparatus is configured to: receive, from the mobility management device, a congestion notification including a slice identifier for a congested slice; transmit, to the slice allocation device, a setting request for setting a subslice to the slice corresponding to the slice identifier, upon reception of the congestion notification; and transmit, when the slice allocation device sets a subslice identifier associated with the slice identifier and the mobility management device adds the subslice identifier, an instruction to establish communication using the subslice corresponding to the subslice identifier and the slice corresponding to the slice identifier to the mobility management device.

BRIEF DESCRIPTION OF DRAWINGS

FIG. 3 illustrates an example of a data structure of client information stored in a storage unit of a client management device according to an embodiment of the present disclosure.

FIG. 4 illustrates an example of a data structure of S-NSSAI management information A registered in a storage unit of a slice allocation device according to an embodiment of the present disclosure.

FIG. 5 illustrates an example of a data structure of subscriber profile information stored in a storage unit of a subscriber data management device according to an embodiment of the present disclosure.

FIG. 6 illustrates an example of a data structure of subscriber network slice information stored in a storage unit of a mobility management device according to an embodiment of the present disclosure.

FIG. 8 illustrates an example of a data structure of updated subscriber network slice information stored in the storage unit of the mobility management device according to an embodiment of the present disclosure.

FIG. 9 illustrates an example of a data structure of S-NSSAI management information which is stored in the storage unit of the slice allocation device and in which a subslice identifier is set according to an embodiment of the present disclosure.

FIG. 10 illustrates an example of a data structure of the subscriber network slice information in which the subslice identifier is registered and updated according to an embodiment of the present disclosure.

FIG. 12 illustrates an example of a data structure of the subscriber network slice information which is stored in the storage unit of the mobility management device 122 and in which traffic decrease information is updated according to an embodiment of the present disclosure.

FIG. 14 illustrates an example of a data structure of exercised subscriber network slice information registered in the storage unit of the mobility management device according to an embodiment of the present disclosure.

DESCRIPTION OF EMBODIMENTS

Description of Embodiments of Present Invention

Figure 1:
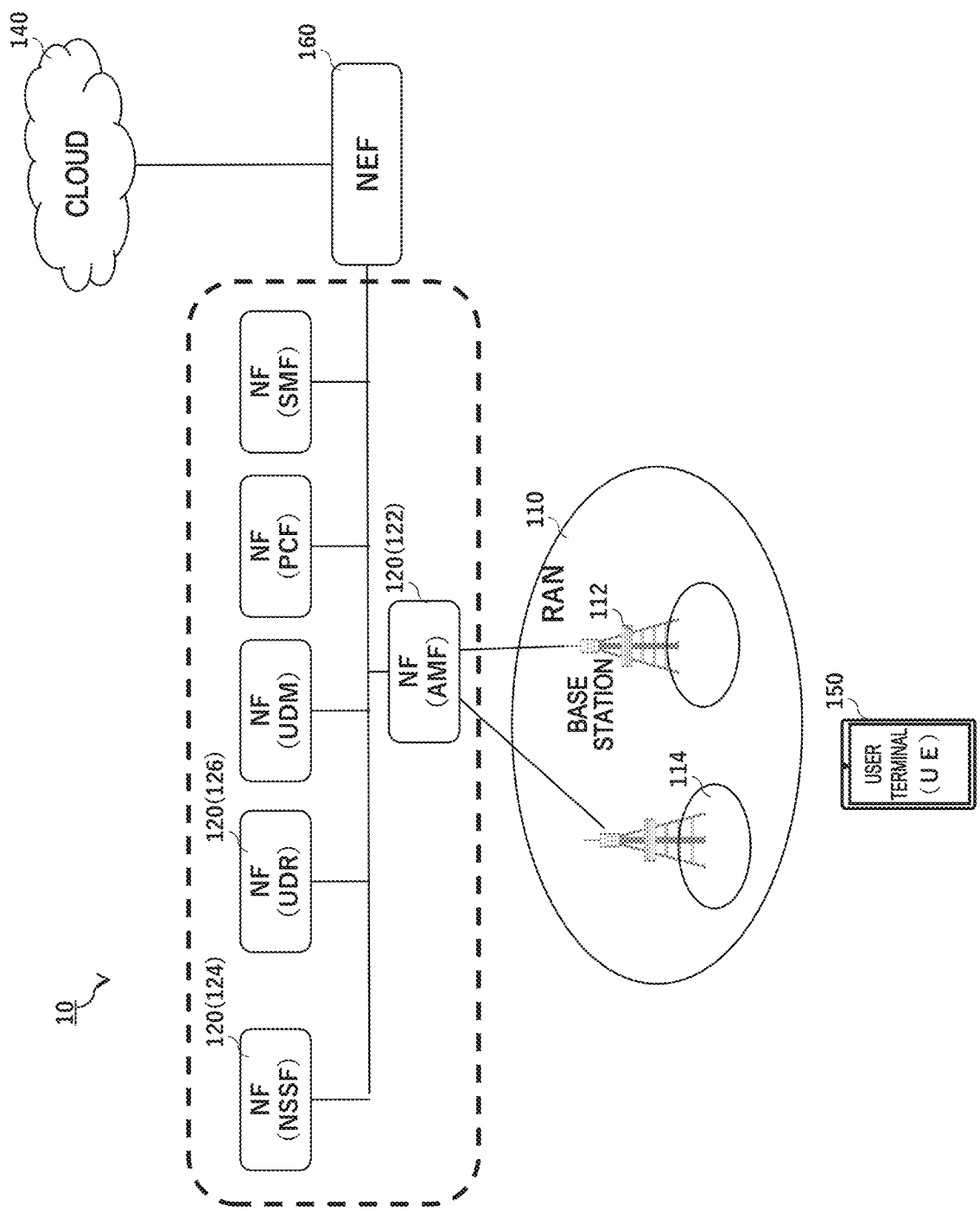
FIG. 1 illustrates a schematic diagram of a system for adding and deleting a network slice according to an embodiment of the present disclosure.

First, contents of embodiments of the present invention will be listed and described. An embodiment of the present invention includes the following configurations.

[Configuration 1]

A characteristic configuration of a method to attain the above-described object is a method to be executed by an information processing apparatus in a cloud-based computing environment, the method including the steps of: receiving, from a mobility management device, a congestion notification including a slice identifier for a congested slice (S704); transmitting, to a slice allocation device, a setting request for setting a subslice to the slice corresponding to the slice identifier, upon reception of the congestion notification (S706); transmitting, when a subslice identifier associated with the slice identifier is set in the slice allocation device (S708) and the subslice identifier is added in the mobility management device (S718), an instruction to establish communication using the subslice corresponding to the subslice identifier and the slice corresponding to the slice identifier to the mobility management device (S724).

[Configuration 2]

Another characteristic configuration of the method according to the present disclosure resides in that the slice allocation device sets the subslice identifier in association with the slice identifier for the congested slice in response to the setting request for setting the subslice (S708).

[Configuration 3]

Another characteristic configuration of the method according to the present disclosure further includes a step (S710, S712) of transmitting, when the subslice identifier is set in the slice allocation device, an addition request for adding the subslice to the mobility management device via a subscriber data management device.

[Configuration 4]

Another characteristic configuration of the method according to the present disclosure resides in that: the subscriber data management device manages a subscriber identification number allocated to a user terminal, a phone number associated with the subscriber identification number, and a slice list identifier allocated to the user terminal; and the step (S710, S712) of transmitting the addition request for adding the subslice to the mobility management device includes: a step (S710) of transmitting, by the information processing apparatus, a first addition request for adding the subslice including the subscriber identification number to the subscriber data management device; and a step (S712) of transmitting, by the subscriber data management device, a second addition request for adding the subslice including the slice list identifier corresponding to the subscriber identification number and the subscriber identification number to the mobility management device.

[Configuration 5]

Another characteristic configuration of the method according to the present disclosure resides in that: the slice allocation device manages the slice list identifier and one or more slice identifiers associated with the slice list identifier; and the mobility management device obtains the subslice identifier corresponding to the slice list identifier from the slice allocation device in response to the second addition request (S714).

[Configuration 6]

Another characteristic configuration of the method according to the present disclosure resides in that: the congestion notification includes a tracking area identifier for a tracking area on which a user terminal locates; the mobility management device manages the slice identifier associated with all the user terminals locating on subordinate tracking areas, congestion information about the slice associated with the slice identifier, and a tracking area identifier associated with the user terminals; and when a traffic amount of the slice corresponding to the slice identifier allocated to each of the user terminals is more than or equal to a maximum threshold, the mobility management device determines that the slice being used by the user terminal is congested (S702).

[Configuration 7]

Another characteristic configuration of the method according to the present disclosure further includes a step (S1102) of receiving, from the mobility management device, a traffic decrease notification including the subslice identifier associated with the deletable subslice with a traffic amount less than or equal to a minimum threshold.

[Configuration 8]

Another characteristic configuration of the method according to the present disclosure further includes a step (S1106) of transmitting a delete setting request for making a setting to delete the deletable subslice to the slice allocation device, upon reception of the traffic decrease notification.

[Configuration 9]

Another characteristic configuration of the method according to the present disclosure further includes a step (S1110, S1112) of transmitting, when deletable information about the subslice is set in the slice allocation device (S1108), a delete request for deleting the subslice to the mobility management device via the subscriber data management device.

[Configuration 10]

Another characteristic configuration of the method according to the present disclosure resides in that: the subscriber data management device manages a subscriber identification number allocated to a user terminal, a phone number associated with the subscriber identification number, and a slice list identifier allocated to the user terminal; and when the subscriber data management device receives a first delete request for deleting the subslice including the subscriber identification number (S1110), a second delete request for deleting a subslice including the slice list identifier corresponding to the subscriber identification number and the subscriber identification number is transmitted to the mobility management device (S1112).

[Configuration 11]

Another characteristic configuration of the method according to the present disclosure resides in that: the slice allocation device manages the slice list identifier, one or more slice identifiers associated with the slice list identifier, the subslice identifier associated with the slice identifier, and the deletable information about the subslice identifier; and the mobility management device obtains the deletable subslice identifier corresponding to the slice list identifier from the slice allocation device in response to the second delete request for deleting the subslice (S1114).

[Configuration 12]

Another characteristic configuration of the method according to the present disclosure further includes a step (S1124) of transmitting, when the deletable subslice identifier is deleted in the mobility management device (S1118), an instruction to establish communication using the slice corresponding to the slice identifier, except for the deletable subslice, to the mobility management device.

[Configuration 13]

A characteristic configuration of an information processing apparatus to attain the above-described object is an information processing apparatus in a cloud-based computing environment, including at least one processor and a memory storing instructions for causing the information processing apparatus to execute, when executed by the at least one processor, the steps of: receiving a congestion notification including a slice identifier for a congested slice from a mobility management device (S704); transmitting, to a slice allocation device, a setting request for setting a subslice to the slice corresponding to the slice identifier, upon reception of the congestion notification (S706); and transmitting, when a subslice identifier associated with the slice identifier is set in the slice allocation device and the subslice identifier is added in the mobility management device (S718), an instruction to establish communication using the subslice corresponding to the subslice identifier and the slice corresponding to the slice identifier to the mobility management device (S724).

[Configuration 14]

A characteristic configuration of a system for attaining the above-described object is a system including: an information processing apparatus in a cloud-based computing environment; a mobility management device; and a slice allocation device, in which the information processing apparatus is configured to: receive, from the mobility management device, a congestion notification including a slice identifier for a congested slice (S704); transmit, to the slice allocation device, a setting request for setting a subslice to the slice corresponding to the slice identifier, upon reception of the congestion notification; and transmit, when the slice allocation device sets a subslice identifier associated with the slice identifier (S708) and the mobility management device adds the subslice identifier (S718), an instruction to establish communication using the subslice corresponding to the subslice identifier and the slice corresponding to the slice identifier to the mobility management device.

Details of Embodiments of Present Invention

Embodiments of the present invention will be described below with reference to the drawings. Note that the present disclosure is not limited to these exemplifications but is defined by the scope of the patent claims and is intended to include any modifications within the scope and meaning equivalent to the scope of the patent claims. In the following description, the same elements are denoted by the same reference numerals in the description of the drawings, and repeated descriptions are omitted.

FIG. 1 illustrates a schematic diagram of a system 10 for controlling a network slice according to an embodiment of the present disclosure. The system 10 can be implemented as a cloud service provided in a cloud-based mobile computing environment. There is a possibility that several hundreds to several thousands of network slices may be set in a single mobile communication network. The system 10 automates the management of these network slices, such as addition and deletion of network slices. The system 10 can add or delete network slices depending on the increase or decrease of traffic in a base station 112. A radio access network (RAN) 110 uses radio waves that are finite resources. Accordingly, if the number of slices is simply increased, the resources reach their limits. According to the present disclosure, radio waves that are finite resources can be effectively used by dynamically allocating slices depending on the usage of slices.

In the present embodiment, the system 10 is a system compliant with the 5th Generation (5G) standard, but is not limited to this example. The system 10 may be compliant with other communication standards such as 4th generation (4G) and 6th generation (6G) standards. The following description is given assuming that the system 10 is compliant with the 5G standard.

The 5G core network (5GC) specifies various functions of the network as network functions (NFs) for each role. FIG. 1 illustrates network functions (NFs) 120 as a plurality of function entities.

Examples of the NFs 120 include an Access and Mobility Management Function (AMF) 122, a Network Slice Selection Function (NSSF) 124, and a Unified Data Repository (UDR) 126 illustrated in FIG. 1. Other examples of the NFs 120 include a Policy Control Function (PCF), a Session Management Function (SMF), and Unified Data Management (UDM). These NFs 120 are connected to a logical communication bus and are further connected to a Network Exposure Function (NEF) 200. In the present disclosure, these NFs 120 may be referred to as various devices in a core network.

In this example, the AMF 122 may be referred to as a mobility management device. The mobility management device 122 includes a registration management function, a connection management function, and a mobility management function for a user terminal 150. The mobility management device 122 stores subscriber network slice information 600 (also referred to as 600A to 600D) in a storage unit. The subscriber network slice information 600 will be described in detail below with reference to FIG. 6.

The UDR 126 may be referred to as a subscriber data management device. The subscriber data management device 126 registers a database and state of each subscriber. The subscriber data management device 126 stores subscriber profile information 500 in a storage unit. The subscriber profile information 500 will be described in detail below with reference to FIG. 5.

The NSSF 124 may be referred to as a slice allocation device. The slice allocation device 124 supports selection of a network slice instance for providing services to the user terminal 150, determination of permitted NSSAI, and determination of the AMF 122 used to provide services to a UE.

The slice allocation device 124 stores S-NSSAI management information 400 (also referred to as 400A to 400C) in a storage unit. The S-NSSAI management information 400 will be described below with reference to FIG. 4.

A cloud 140 provides a user with IT resources, such as a server and a storage, and applications via a network such as the Internet. The cloud 140 can provide the user with computer resources for executing the functions of the NEF 200 on the Internet. The use of the cloud 140 enables the system 10 to support various applications.

The Network Exposure Function (NEF) 200 is used to safely release services, capabilities, and the like to the outside (cloud 140) by 3GPP® network functions (NFs 120). The NEF 200 may be referred to as an API provision device. In the 5G core network (5GC), many of control NFs for detecting a movement of the user and controlling the setting and release of a data transfer path for ensuring the quality of a required speed, delay time, and the like can be used from the outside via an Application Programming Interface (API). The Network Exposure Function (NEF) 200 provides this API. The NEF 200 supports the release of capabilities and events, secure provision of information from an external application to the 3GPP network, and conversion of internal/external information. When the NEF 200 is accessed from the cloud 140, the control NFs can be controlled via the NEF 200.

The plurality of NFs 120, the NEF 200, and the cloud 140 may be implemented by one or more information processing apparatuses. In another example, the plurality of NFs 120, the NEF 200, and the cloud 140 may be implemented as software on a general-purpose server by a virtualization technique.

The user terminal 150 is a terminal to be used by the user and receives various input operations by the user. The user terminal 150 incorporates a Subscriber Identity Module (SIM), and is implemented as, for example, a mobile terminal such as a smartphone, a personal digital assistant (PDA), a tablet computer, or a laptop computer (so-called notebook computer).

The information processing apparatus includes a control unit, a storage unit, and a communication unit. The control unit is implemented by, for example, arithmetic means such as a processor (CPU). The storage unit is implemented by storage means such as a read-only memory (ROM), a random access memory (RAM), or a hard disk drive (HDD). Various programs can be stored in various memories such as a ROM and a RAM, an HDD, and the like. The control unit functions to cooperate with various memories, such as a ROM and a RAM, and storage means such as an HDD, and executes various programs. Thus, information processing is implemented by software using hardware resources.

According to the present disclosure, the NEF 200 can provide the cloud 140 with not only the NF functions provided by the AMF 122, the UDR 126, the UDM, the PCF, and the SMF, but also with the NF function provided by the NSSF 124. This makes it possible to manage network slices from the cloud 140 via the NEF 200 using the NSSF 124. Heretofore, in the 3GPP standard technique, it has been difficult to provide services provided by the NSSF 124 to the cloud 140 based on a request from the user terminal 150. Accordingly, if the base station 112 accessed by the user terminal 150 using network slices is congested, the access needs to be limited on a per mobility management device 122 basis. According to the present disclosure, upon detecting a congestion in a slice used by the user terminal 150, the mobility management device 122 accessed by the user terminal 150 via the base station 112 can control the addition and deletion of slices for each user terminal 150 subordinate to the base station 112 using the NF function provided by the NSSF 124.

As illustrated in FIG. 1, the RAN 110 composed of one or more base stations 112 is present under control of the AMF 122. The RAN 110 is a radio access network composed of an antenna or the base station 112 ("gNB" in 5G), or the like.

A tracking area (TA) 114 is a position registration area subordinate to the AMF 122 and is identified by a tracking area identifier (TAI). When the user terminal 150 moves from a first tracking area to a second tracking area, the base station 112 informs the user terminal 150 of the tracking area identifier as an identification number for a destination tracking area to which the base station belongs, thereby making it possible to recognize the tracking area on which the user terminal locates. The user terminal 150 performs position registration (TAU: Tracking Area Update), thereby registering the tracking area on which the user terminal 150 locates in the core-network-side AMF 122. The allocation of tracking areas can be performed on each base station, or can be performed on each group by dividing a plurality of base stations 112 into groups. In a case where the base stations are divided into groups, when the source base station 112 and the destination base station 112 belong to the TA 114 of the same group, the position registration is not carried out even when the base station 112 on which the user terminal locates is changed. If the terminal moves within the TA 114 (e.g., TA #1, TA #2) managed by one AMF 122, the position registration is not carried out. The position registration is carried out when the AMF 122 on which the position registration is performed is changed.

Each network slice is identified by a slice identifier. This slice identifier is an identifier required for implementing network slicing, and is used to associate the user terminal 150, the RAN 110, and a core virtual network. This slice identifier is delivered to the user terminal 150, the radio access network RAN 110, and the core network, thereby making it possible to virtually divide the entire 5G network. The slice identifier is referred to as Single-Network Slice Selection Assistance Information (S-NSSAI) in the 3GPP. The slices can be used differently for each application to be used in the user terminal 150 by allocating a plurality of slice identifiers to a single user terminal 150. For example, the user terminal 150 can be connected to a slice (S-NSSAI #1) for streaming in the case of using a streaming application, and can be connected to a slice (S-NSSAI #2) exclusively for business in the case of using an application for business use. The S-NSSAI #1 and S-NSSAI #2 indicate slice identifiers. Three types of standard slices are defined as "SST: Slice and Service Type", and include "eMBB: enhanced Mobile Broadband" for high-speed/large-capacity communication, "URLLC: Ultra-Reliable and Low Latency Communications" for low-delay/high-reliability communication, and "mMTC: massive Machine Type Communication" for multiple simultaneous connections.

Figure 2:
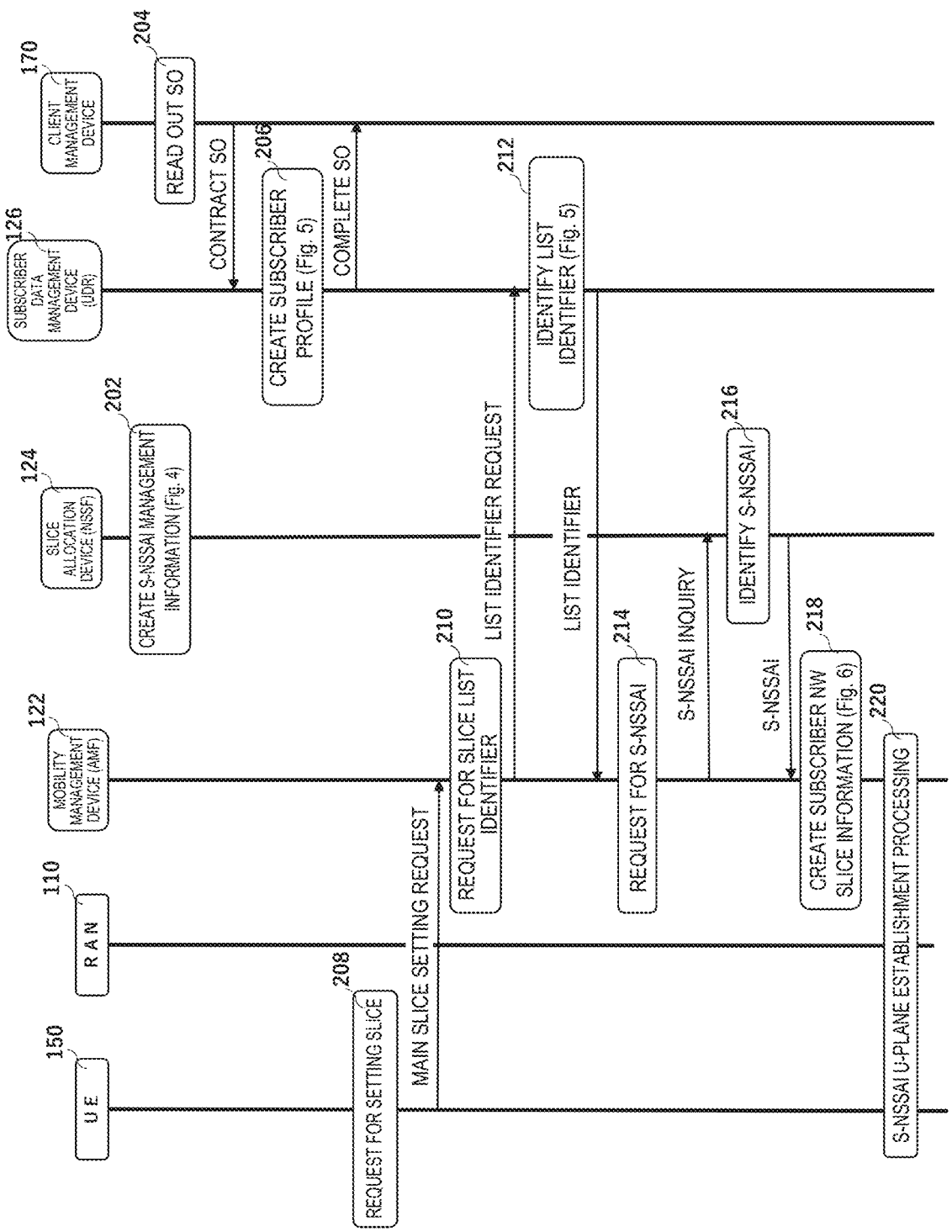
FIG. 2 illustrates a processing flow for setting a main network slice in a user terminal according to an embodiment of the present disclosure.

FIG. 2 illustrates a flow of processing 200 for setting a main network slice in the user terminal 150 according to an embodiment of the present disclosure.

Assume that, prior to the processing, a data structure of client information 300 illustrated in FIG. 3 is stored in a storage unit of a client management device 170. The client management device 170 includes various information required for managing network services provided to the user from a mobile communication carrier.

FIG. 3 illustrates an example of a data structure of the client information 300 stored in the storage unit of the client management device 170 according to an embodiment of the present disclosure. The client information 300 stores various information about user contracts for each subscriber identification number of users subscribing to network services provided by a mobile communication carrier. The client information 300 can include items of a subscriber identification number, one slice list identifier associated with the subscriber identification number, and a slice identifier S-NSSAI. One slice list identifier and one or more slice identifiers can be allocated to each subscriber identification number. If the user subscribes to a plurality of logical lines, a plurality of slice identifiers is allocated to each slice list identifier. Different slice identifiers (e.g., S-NSSAI #1 for voice call, S-NSSAI #2 for application for business use, and S-NSSAI #3 for streaming application) can be allocated to the respective services provided by the mobile communication carrier. The slice list identifier is used to associate the subscriber identification number managed by the subscriber data management device 126 with the slice identifier managed by the slice allocation device 124. The number and sign in parenthesis shown in each data structure indicate an example of an ID allocated to various data. The subscriber identification number is International Mobile Subscriber Identity (IMSI) and is generally presented as a 15-digit number. In the present disclosure, the subscriber identification number is represented as "****1", for convenience of description.

The slice allocation device 124 shares the client information 300 with the client management device 170.

First, in step S202, the slice allocation device 124 creates the S-NSSAI management information 400A illustrated in FIG. 4 with reference to the client information 300. The slice allocation device 124 identifies the subscriber identification numbers for all the user terminals 150 associated with each TAI, and reads out slice list identifiers associated with all the identified user terminals 150 and the slice identifiers with reference to the client information 300. The slice allocation device 124 stores the slice list identifiers read out for each TAI and slice identifiers in the S-NSSAI management information 400A.

FIG. 4 illustrates an example of a data structure of the S-NSSAI management information 400A registered in the storage unit of the slice allocation device 124 according to an embodiment of the present disclosure. The S-NSSAI management information 400A includes information about slices associated with the identifiers (in this example, "TAI #1" to "TAI #N") for all tracking areas subordinate to the mobility management device 122. As illustrated in FIG. 4, the S-NSSAI management information 400A includes items of TAI (e.g., "TAI #1"), all slice list identifiers ("S-NSSAI List #1 to #4" associated with "TAI #1") associated with each TAI, and slice identifiers (e.g., "S-NSSAI #1 to #3" corresponding to "S-NSSAI List #1") corresponding to the slice list identifiers.

The S-NSSAI management information 400A may link a subslice identifier item as a lower item of a main slice identifier. Since no subslice is set in step S202, "NULL" is set for the sub S-NSSAI of the S-NSSAI management information 400A.

Next, processing of reflecting data on a service order (SO) in the system 10 will be described with reference to steps S204 to S206.

In step S204, the client management device 170 reads out data on the service order from the user, and transmits the data to the subscriber data management device 126. The service order data includes the subscriber identification number of the user that has subscribed to the network service, the slice list identifier associated with the subscriber identification number, and the phone number.

Next, in step S206, the subscriber data management device 126 creates the subscriber profile information 500 illustrated in FIG. 5 based on the received service order data (subscriber identification number, slice list identifier, and phone number), and stores the subscriber profile information in the storage unit.

FIG. 5 illustrates an example of a data structure of the subscriber profile information 500 stored in the storage unit of the subscriber data management device 126 according to an embodiment of the present disclosure. As illustrated in FIG. 5, the subscriber profile information 500 includes items of the subscriber identification number, the phone number corresponding to the subscriber identification number, and the slice list identifier. The subscriber data management device 126 does not manage detailed information about slices.

Upon registering the subscriber profile information 500, in step S206, the subscriber data management device 126 transmits a notification indicating that a contracting procedure based on service order data is completed to the client management device 170.

In the subsequent processing of steps S208 to S218, main slice setting processing is performed on the user terminal 150.

First, in step S208, the user terminal 150 transmits a main slice setting request to the mobility management device 122 (AMF). The main slice setting request includes the subscriber identification number (e.g., "****1") of the user terminal 150, and the identifier (e.g., "TAI #1") for the tracking area on which the user terminal 150 locates.

Next, in step S210, upon receiving the slice setting request, the mobility management device 122 transmits the slice list identifier request, together with the subscriber identification number (e.g., "****1"), to the subscriber data management device 126.

Next, in step S212, the subscriber data management device 126 reads out the subscriber profile information 500 illustrated in FIG. 5, and identifies the slice list identifier (in this case, "S-NSSAI list #1") corresponding to the received subscriber identification number "****1". The subscriber data management device 126 transmits the identified slice list identifier to the mobility management device 122.

Next, in step S214, the mobility management device 122 transmits the TAI (in this case, "TAI #1"), the slice list identifier (in this case, "S-NSSAI list #1"), and the slice identifier request corresponding to the received slice list identifier to the slice allocation device 124.

Next, in step S216, the slice allocation device 124 reads out S-NSSAI management information 400A illustrated in FIG. 4, and identifies the slice identifiers (in this case, "S-NSSAI #1 to #3") corresponding to the received TAI slice list identifier (in this case, "S-NSSAI list #1"). The slice allocation device 124 transmits all the identified slice identifiers to the mobility management device 122.

Next, in step S218, the mobility management device 122 creates the subscriber network (NW) slice information 600 illustrated in FIG. 6 based on the received slice identifier. In this example, the slice identifiers "S-NSSAI #1 to #3" are registered for the subscriber identification number "****1" of the user terminal 150 that has issued the slice setting request.

FIG. 6 illustrates an example of a data structure of the subscriber network slice information 600A stored in the storage unit of the mobility management device 122 according to an embodiment of the present disclosure. The subscriber network slice information 600A stores various information for each subscriber identification number associated with all user terminals 150 locating on the RAN 110 subordinate to the mobility management device 122. As illustrated in FIG. 6, the subscriber network slice information 600A includes items of the subscriber identification number, the tracking area identifier associated with this subscriber identification number, and the slice identifier. One tracking area identifier and one or more slice identifiers can be allocated to each subscriber identification number. The subscriber network slice information 600A can include a subslice identifier item as a lower item of the slice identifier, and a congestion information item. In step S218, only the main slice is set, and no subslice is set. Accordingly, the initial value "NULL" is set in the lower subslice identifier item. Further, since the communication of the user terminal 150 is not started in step S218, the initial value "NULL" is set in the congestion information.

In the example of FIG. 6, four user terminals 150 to which the subscriber identification numbers "**1" to "4" are allocated, are subordinate to TAI #1. The slices identified by S-NSSAI #1 to #3 are allocated to the user terminal 150 corresponding to the subscriber identification number 1. The slices identified by S-NSSAI #1 and #2 are allocated to the user terminal 150 corresponding to the subscriber identification number 2. The slices identified by S-NSSAI #1 and #3 are allocated to the user terminal 150 corresponding to the subscriber identification number 3. The slices identified by S-NSSAI #3 are allocated to the user terminal 150 corresponding to the subscriber identification number **4. In this example, for convenience of description, the number of TAs is one, the number of user terminals is four, and one to three slices are allocated to each user terminal. However, the number of TAs, the number of user terminals, and the number of slices are not limited to the numbers in the illustrated example, as a matter of course.

When the slice identifiers (in this case, "S-NSSAI #1", "S-NSSAI #2", and "S-NSSAI #3") associated with the subscriber identification number (e.g., "****1") of the user terminal 150 that has issued the slice setting request are registered in the mobility management device 122, in step S220, the user terminal 150 can establish a route formed of network elements (such as UPF) of a user plane (hereinafter may be referred to as a user plane route) using the registered slice identifiers, and can start communication.

The processing of steps S208 to S220 in which slices are set in response to the slice setting request from the user terminal 150 to start communication using the slices set by the user terminal 150 has been described above.

Next, processing to be performed when a congestion occurs in a slice during communication of the user terminal 150 will be described.

<Addition of Network Slice>

Figure 7:
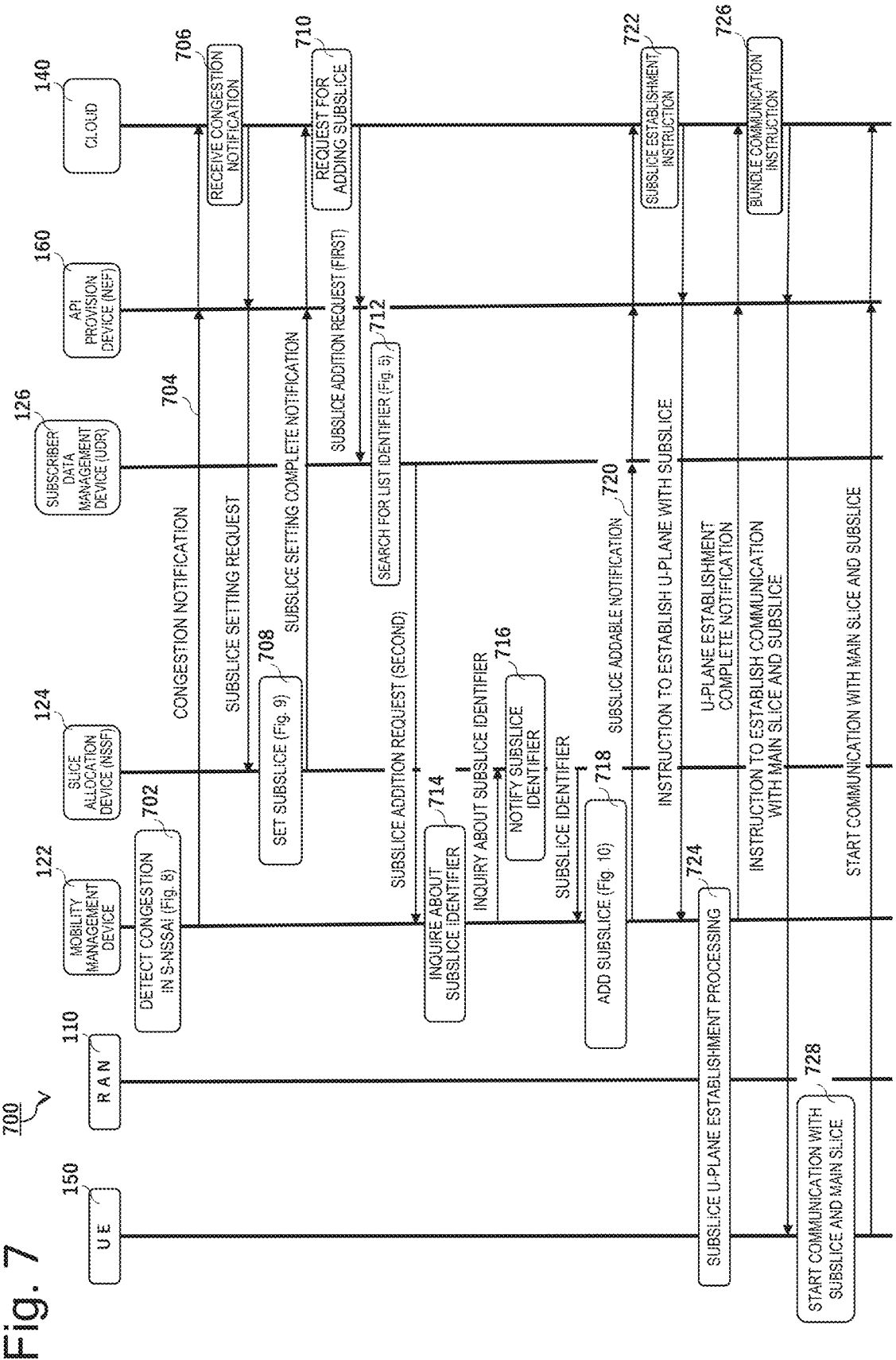
FIG. 7 illustrates a processing flow when a congestion occurs in a slice according to an embodiment of the present disclosure.

FIG. 7 illustrates a flow of processing 700 when a congestion occurs in a slice in the system 10 according to an embodiment of the present disclosure. The processing 700 illustrates a processing flow from detection of occurrence of a congestion in a slice to addition of a network slice.

The mobility management device (AMF) 122 detects the traffic amount of each slice being used by one or more connected user terminals 150 in the subordinate RAN 110 at predetermined intervals. A maximum threshold of the communication data amount is determined for each slice. When the traffic amount of data on a slice is more than or equal to the maximum threshold, the mobility management device 122 determines that the slice is congested.

In step S702, if the mobility management device 122 determines that there is a congested slice, the mobility management device 122 identifies the slice identifier (S-NS-SAI) for the congested slice. Further, the mobility management device 122 updates congestion information about the subscriber network slice information 600A for each slice identifier.

FIG. 8 illustrates an example of a data structure of the updated subscriber network slice information 600B stored in the storage unit of the mobility management device 122 according to an embodiment of the present disclosure. The subscriber network slice information 600B is the same as the subscriber network slice information 600A illustrated in FIG. 6, except that the congestion information is updated. In the illustrated example, "Y" indicates that the corresponding slice is congested, and "N" indicates that the slice is not congested. In the illustrated example, the slices identified by the "S-NSSAI #1, #2" of the subscriber identification number "**1" and the slices identified by the "S-NSSAI #1" of the subscriber identification number "**2" are congested and the other slices are not congested. The following description is given assuming that only the slices corresponding to the tracking area "TAI #1" are congested, for convenience of description.

In step S704, the mobility management device 122 transmits the congested slice identifier, the tracking area identifier associated with the congested slice identifiers, and the subscriber identification numbers associated with the congested slice identifiers in the slice identifiers associated with all subordinate tracking areas (in this case, "TAI #1 to #N"), together with the congestion notification, to the cloud 140 via an API provision device 160 (NEF) with reference to the subscriber network slice information 600B.

In step S704, the mobility management device 122 transmits all congested slice identifiers associated with "TAI #1" ("S-NSSAI #1, #2" associated with the subscriber identification number "**1", and "S-NSSAI #1" associated with the subscriber identification number "2"), the tracking area identifier "TAI #1" associated with the congested slice identifiers, the subscriber identification number "1" associated with the congested slice identifiers "S-NSSAI #1, #2", and the subscriber identification number "2" associated with the congested slice identifier "S-NSSAI #4" to the cloud 140. The slice identifiers "S-NSSAI #1 and #2" associated with the subscriber identification number "3" and the slice identifier "S-NSSAI #1" associated with the subscriber identification number "4" are not congested, and thus these slice identifiers and the subscriber identification numbers "3" and "**4" associated with these slice identifiers are not transmitted to the cloud 140.

Next, in step S706, upon receiving the slice congestion notification from the mobility management device 122, the cloud 140 stores the congested slice identifiers (in this example, "S-NSSAI #1, #2" associated with the subscriber identification number "**1", and "S-NSSAI #1" associated with the subscriber identification number "2"), the tracking area identifier (in this example, "TAI #1") associated with the congested slice identifiers, and the subscriber identification numbers (subscriber identification numbers "1 and **2") in the storage unit.

In step S706, the cloud 140 transmits a subslice setting request including the congested slice identifiers and the tracking area identifiers associated with the congested slice identifiers to the slice allocation device 124 via the API provision device 160.

Next, in step S708, the slice allocation device 124 sets a subslice identifier as a lower item of the received congested slice identifiers. The slice allocation device 124 reads out the S-NSSAI management information 400A illustrated in FIG.

4, sets the subslice identifier, and provides a subslice identifier setting complete notification indicating that the setting of the subslice identifier is completed to the cloud 140 via the API provision device 160.

FIG. 9 illustrates an example of a data structure of the S-NSSAI management information 400B which is stored in the storage unit of the slice allocation device 124 and in which subslice identifiers are set according to an embodiment of the present disclosure. The S-NSSAI management information 400B illustrated in FIG. 9 is the same as the S-NSSAI management information 400A illustrated in FIG. 4, except that subslice identifiers are set. The S-NSSAI management information 400B can include information about all TAIs subordinate to the mobility management device 122. As illustrated in FIG. 9, the S-NSSAI management information 400B includes items of TAI #1, all slice list identifiers associated with TAI #1, and the slice identifiers allocated to all user terminals 150 associated with TAI #1.

The S-NSSAI management information 400B associates the subslice identifier item as a lower item of the main slice identifier. In this example, the subslice identifiers (S-NSSAI #1', #2') are added as lower items of the congested higher-level slice identifiers (e.g., S-NSSAI #1, #2 corresponding to S-NSSAI List #1). In step S708, the subslice identifier is not linked to the subscriber identification number. The following processing of steps S710 to S718 is performed to link this subslice identifier to the subscriber identification number of the user terminal 150.

Referring again to FIG. 7, in step S710, the cloud 140 receives the subslice identifier setting complete notification from the slice allocation device 124 via the API provision device 160. Then, the cloud 140 transmits a first addition request for adding a subslice, including the subscriber identification numbers (in this example, "**1" and "**2") stored in step S706 to the subscriber data management device 126.

Next, in step S712, upon receiving the subslice addition request, the subscriber data management device 126 reads out the slice list identifier associated with the subscriber identification number with reference to the subscriber profile information 500 illustrated in FIG. 5 using the subscriber identification number as a key. In this example, "S-NSSAI List #1" associated with the subscriber identification number "**1" and "S-NSSAI List #2" associated with the subscriber identification number "**2" are read out.

Further, in step S712, the subscriber data management device 126 transmits a second addition request for adding a subslice, including the read subscriber identification numbers ("**1", "**2") and the slice list identifiers (S-NSSAI List #1, #2), to the mobility management device 122.

Next, in step S714, upon receiving the second addition request for adding the subslice, the mobility management device 122 transmits a request for subslice identifiers associated with the slice list identifiers, together with the received slice list identifiers (S-NSSAI List #1, #2), to the slice allocation device 124.

Next, in step S716, upon receiving an inquiry about the subslice identifiers from the mobility management device 122, the slice allocation device 124 reads out the slice identifiers associated with the received slice list identifiers with reference to the S-NSSAI management information 400B illustrated in FIG. 9. In this example, S-NSSAI #1, #2 associated with S-NSSAI List #1 and S-NSSAI #1 associated with S-NSSAI List #2 are read out.

In step S716, the slice allocation device 124 reads out the lower subslice identifiers corresponding to the congested slice identifiers with reference to the S-NSSAI management information 400B illustrated in FIG. 9. In the example of FIG. 9, subslice identifiers "S-NSSAI #1', #2'" corresponding to the main slice identifier "S-NSSAI #1" and a subslice identifier "S-NSSAI #1'" corresponding to the main slice identifier "S-NSSAI #2" are read out. The slice allocation device 124 transmits the subslice identifiers and the corresponding main slice identifiers to the mobility management device 122.

Next, in step S718, upon receiving the subslice identifier, the mobility management device 122 identifies which subslice is to be added to which main slice with reference to the subscriber network slice information 600B illustrated in FIG. 8, and registers and updates the subslice identifiers. FIG. 10 illustrates an example of a data structure of the subscriber network slice information 600C in which subslice identifiers are registered and updated according to an embodiment of the present disclosure.

Next, in step S720, the mobility management device 122 transmits a subslice addable notification to the subscriber data management device 126. This subslice addable notification is an Ack notification indicating that a subslice can be added in response to the second addition request for adding a network slice from the subscriber data management device 126 in step S712.

Further, in step S720, the subscriber data management device 126 transmits the subslice addable notification received from the mobility management device 122 to the cloud 140 via the API provision device 160. This addable notification is an Ack notification indicating that a subslice can be added in response to the first addition request for adding a network slice from the cloud 140 in step S710.

Next, in step S722, upon receiving the slice addable notification, the cloud 140 transmits an instruction to establish an additional user plane route corresponding to the subslice identifier to the mobility management device 122 via the API provision device 160. Note that in the present disclosure, the processing of steps S702 to S722 is executed using network elements (AMF, NSSF, UDR) of a control plane.

Next, in step S724, upon receiving the instruction to establish an additional user plane route corresponding to the subslice identifier, the mobility management device 122 reads out the subslice identifiers "S-NSSAI #1', #2'" corresponding to the main slice identifier "S-NSSAI #1" and the subslice identifier "S-NSSAI #1'" corresponding to the main slice identifier "S-NSSAI #2" from the subscriber network slice information 600C illustrated in FIG. 10. Next, the mobility management device 122 performs processing for establishing a user plane route using the subslice identifier with the user terminal 150. When the establishment of the user plane route is completed, the mobility management device 122 transmits a user plane route establishment complete notification to the cloud 140 via the API provision device 160.

Next, in step S726, upon receiving the user plane route establishment complete notification, the cloud 140 transmits an instruction to start bundle communication using the main slice and the subslice as one logical line to the user terminal 150 corresponding to the congested subscriber identification number received in step S706.

Next, in step S728, upon receiving the bundle communication start instruction, the user terminal 150 can start the bundle communication using a plurality of logical slices. The user terminal 150 transmits a notification indicating that the bundle communication is started to the cloud 140. In the present disclosure, the processing of step S728 is executed using network elements of the user plane.

In another aspect of the present disclosure, in step S726, upon receiving the user plane route establishment complete notification, the cloud 140 may transmit an instruction to start the bundle communication with the user terminal 150 by using Mobile Terminated (MT) and Short Message Service (SMS) using a phone number. The MT and SMS are specified in 4.13.3.6 MT SMS over NAS in CM-IDLE state via 3GPP access in the 3GPP TS 23.502. The phone number and the subscriber identification number of the user terminal 150 are managed in the subscriber profile information 500 of the subscriber data management device 126. The cloud 140 can obtain the phone number corresponding to the subscriber identification number from the subscriber data management device 126.

In another aspect of the present disclosure, in step S726, the user terminal 150 may start the bundle communication according to the user's selection. Upon receiving the bundle communication start instruction, the user terminal 150 may display an inquiry "Do you start bundle communication?", as well as selection buttons indicating "start" and "not start" for this inquiry, on a display unit of the user terminal 150. When the user selects the "start" button, the user terminal 150 can start the bundle communication.

In another aspect of the present disclosure, a slice may be added as a lower item of a subslice. The mobility management device 122 can identify each congested subslice of the user terminal 150 in the subordinate RAN 110. When the traffic amount in a subslice is more than or equal to the maximum threshold, the mobility management device 122 can determine that the subslice is congested, and can add another subslice (second subslice) as a lower item of the subslice (first subslice). If it is determined that the first subslice is congested, the system 10 can add the second subslice as a lower item of the first subslice by repeatedly carrying out steps S702 to S718. The user terminal 150 can perform bundle communication using the main slice, the first subslice, and the newly added second subslice as one line.

In another aspect of the present disclosure, when a subslice is further set as a lower item of the subslice, the maximum threshold for the traffic amount of the higher slice may be the same as or different from the maximum threshold for the traffic amount of the lower slice.

According to the present disclosure, the addition and deletion of network slices can be managed from the cloud 140 using the NSSF 124 as one control NF via the NEF 200. Heretofore, in a case where the user terminal 150 connects to a specific dedicated slice, every application on the user terminal 150 has been connected to the same dedicated slice. According to the present disclosure, if the user terminal 150 establishes communication using different dedicated slices for each application and a congestion occurs in one of the dedicated slices, the communication capacity for the application using the congested slice can be dynamically increased by bundling the congested slice with the subslice. Since the radio access network uses radio waves that are finite resources, an increase in the number of slices leads to a scramble for the resources. According to the present disclosure, radio access network resources can be effectively used by adding a subslice only to a congested slice.

According to the present disclosure, the mobility management device 122 detects whether a congestion occurs in each slice being used by one or more connected user terminals 150 in the subordinate RAN 110 at predetermined intervals. Accordingly, the mobility management device 122 can dynamically allocate slices on a time axis depending on the usage of the user terminal 150.

The subslice addition processing has been described above with reference to FIG. 7. Next, processing for deleting added subslices will be described with reference to FIG. 11.

<Deletion of Network Slice>

Figure 11:
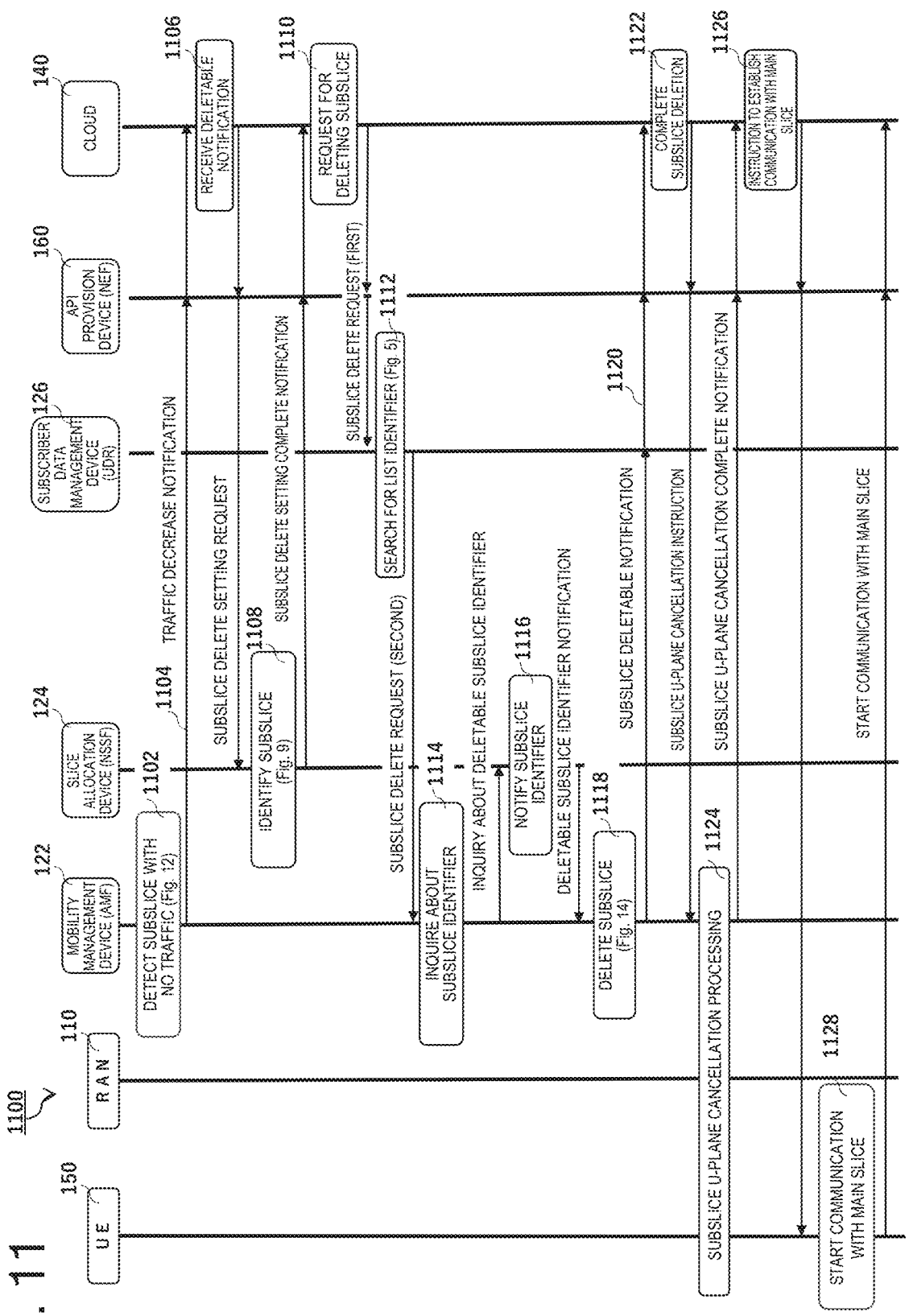
FIG. 11 illustrates a processing flow of deleting a network slice in a system according to an embodiment of the present disclosure.

FIG. 11 illustrates a flow of processing 1100 for deleting a network slice in the system 10 according to an embodiment of the present disclosure.

The mobility management device (AMF) 122 detects the traffic amount of each slice being used by one or more connected user terminals 150 in the subordinate RAN 110 at predetermined intervals. The maximum threshold and the minimum threshold for the communication data amount are determined for each slice. When the data amount in the communication is more than or equal to the maximum threshold, the mobility management device 122 determines that the slice is congested. The minimum threshold for the traffic amount of a higher slice may be the same as or different from the minimum threshold for the traffic amount of a lower slice.

First, in step S1102, the mobility management device 122 determines whether there is a congested slice. If it is determined that there is no congested slice, it is determined whether only the main slice is being used by the user terminal 150, or the main slice and one or more subslices are being used by the user terminal 150, with reference to the latest subscriber network slice information 600C (FIG. 10). If only the main slice is being used, the processing is terminated without proceeding to step S1104.

On the other hand, if the main slice and subslices are being used, the mobility management device 122 determines whether the traffic amount of each subslice is less than or equal to the minimum threshold. When the traffic amount of the slice is less than or equal to the minimum threshold, the mobility management device 122 identifies subslice identifiers for subslices with the traffic amount less than or equal to the minimum threshold with reference to the latest subscriber network slice information 600C (FIG. 10), and registers the subslice identifiers in the subscriber network slice information 600C.

FIG. 12 illustrates an example of a data structure of the subscriber network slice information 600D which is stored in the storage unit of the mobility management device 122 and in which traffic decrease information is updated according to an embodiment of the present disclosure. The subscriber network slice information 600D is the same as the subscriber network slice information 600C illustrated in FIG. 10, except that the traffic decrease information is added. In the illustrated example, in the item of traffic decrease information. "Y" indicates that the traffic amount of the corresponding subslice is less than or equal to the minimum threshold, and "N" indicates that the traffic amount exceeds the minimum threshold. In the illustrated example, the traffic amount of the subslice "S-NSSAI #1" corresponding to "S-NSSAI #1" is less than or equal to the minimum threshold, and the traffic amount of the other subslices (subslice "S-NSSAI #2" corresponding to "S-NSSAI #1", and subslice "S-NSSAI #1" corresponding to "S-NSSAI #2") exceeds the minimum threshold.

Next, in step S1104, the mobility management device 122 transmits a traffic decrease notification, including the subslice identifier with the traffic amount less than or equal to the minimum threshold in the subslice identifiers associated with all subordinate tracking areas (in this case, "TAI #1 to #N"), the tracking area identifier associated with the subslice identifier, and the subscriber identification number, to the cloud 140 via the API provision device 160 (NEF) with reference to the updated subscriber network slice information 600D (FIG. 12). In this example, the mobility management device 122 transmits the traffic decrease notification, including the subslice identifier that is associated with "TAI #1" and has the traffic amount less than or equal to the minimum threshold (subslice identifier "S-NSSAI #1'" for the slice associated with the subscriber identification number "**1"), the tracking area identifier ("TAI #1") associated with this subslice identifier, and the subscriber identification number ("**1") associated with this subslice identifier, to the cloud 140.

Next, in step S1106, upon receiving the traffic decrease notification from the mobility management device 122, the cloud 140 stores the received subslice identifier, the tracking area identifier associated with the subslice identifier, and the subscriber identification number in the storage unit.

Further, the cloud 140 transmits a subslice delete setting request, including the subslice identifier for the deletable subslice with the traffic amount less than or equal to the minimum threshold and the tracking area identifier associated with the subslice identifier, to the slice allocation device 124 via the API provision device 160.

Next, in step S1108, the slice allocation device 124 reads out the S-NSSAI management information 400B illustrated in FIG. 9, identifies the deletable subslice identifier (in this example, "S-NSSAI #1'"), and adds "deletable information" to the deletable subslice identifier to be stored. Further, the slice allocation device 124 issues a subslice delete setting complete notification to the cloud 140 via the API provision device 160.

Figure 13:
FIG. 13 illustrates an example of a data structure of the S-NSSAI management information which is stored in the storage unit of the slice allocation device and in which deletable information is updated according to an embodiment of the present disclosure.

FIG. 13 illustrates an example of a data structure of the S-NSSAI management information 400C which is stored in the storage unit of the slice allocation device 124 and in which the deletable information is updated according to an embodiment of the present disclosure. The S-NSSAI management information 400C illustrated in FIG. 13 is the same as the S-NSSAI management information 400B illustrated in FIG. 9, except that the deletable information corresponding to the subslice identifier "S-NSSAI #1'" is added. The following processing of steps S1110 to S1118 is performed to link this deletable subslice identifier to the subscriber identification number of the user terminal 150.

Referring again to FIG. 11, in step S1110, upon receiving the deletable subslice identifier from the slice allocation device 124 via the API provision device 160, the cloud 140 transmits a first delete request for deleting a subslice, including the subscriber identification number (in this example, "****1") stored in step S1106, to the subscriber data management device 126.

Next, in step S1112, upon receiving the first delete request for deleting a subslice, the subscriber data management device 126 reads out the slice list identifier associated with the subscriber identification number with reference to the subscriber profile information 500 illustrated in FIG. 5 using the subscriber identification number as a key. In this example, "S-NSSAI List #1" associated with the subscriber identification number "****1" is read out.

Further, in step S1112, the subscriber data management device 126 transmits a second delete request for deleting a subslice, including the read subscriber identification number ("****1") and the slice list identifier (S-NSSAI List #1), to the mobility management device 122.

Next, in step S1114, upon receiving the second delete request for deleting a subslice, the mobility management device 122 transmits a deletable subslice identifier request associated with the slice list identifier, together with the received slice list identifier (S-NSSAI List #1), to the slice allocation device 124.

Next, in step S1116, upon receiving an inquiry about the deletable subslice identifier from the mobility management device 122, the slice allocation device 124 reads out the deletable subslice identifier corresponding to the received slice list identifier and the main slice identifier associated with the subslice identifier with reference to the S-NSSAI management information 400C illustrated in FIG. 13. In this example, the subslice identifier "S-NSSAI #1'" associated with S-NSSAI List #1 and "S-NSSAI #1" are read out. The slice allocation device 124 transmits the subslice identifier and the main slice identifier corresponding to the subslice identifier to the mobility management device 122.

Next, in step S1118, upon receiving the deletable subslice identifier, the mobility management device 122 deletes the received subslice identifier "S-NSSAI #1'" with reference to the subscriber network slice information 600D illustrated in FIG. 12.

FIG. 14 illustrates an example of a data structure of exercised subscriber network slice information 600E registered in the storage unit of the mobility management device 122 according to an embodiment of the present disclosure. In the subscriber network slice information 600E, the subslice identifier allocated to the subslice in which the traffic amount has decreased is deleted.

Next, in step S1120, the mobility management device 122 transmits a subslice deletable notification indicating that the subslice being used by the user terminal 150 can be deleted to the subscriber data management device 126. This subslice deletable notification is an Ack notification indicating that the subslice can be deleted in response to the second delete request for deleting a network slice from the subscriber data management device 126 in step S1112.

Further, in step S1120, the subscriber data management device 126 transmits the subslice deletable notification received from the mobility management device 122 to the cloud 140 via the API provision device 160. This deletable notification is an Ack notification indicating that the subslice can be deleted in response to the first delete request for deleting a network slice from the cloud 140 in step S1110.

Next, in step S1122, upon receiving the slice deletable notification, the cloud 140 transmits an instruction to establish a user plane route using only the slice (in this example, the main slice), except for the subslice corresponding to the subslice identifier, to the mobility management device 122 via the API provision device 160. If a plurality of subslices is set for one main slice, an instruction to establish the user plane route without using only specific one of the plurality of set subslices is transmitted. In the present disclosure, the processing of steps S1102 to S1122 is executed using network elements (AMF, NSSF, and UDR) of the control plane.

Next, in step S1124, upon receiving the instruction to cancel the establishment of the user plane route corresponding to the subslice identifier, the mobility management device 122 reads out only the main slice identifier "S-NSSAI #1" from the subscriber network slice information 600E illustrated in FIG. 14. Next, the mobility management device 122 performs processing for establishing the user plane route using only the main slice identifier with the user terminal 150 to cancel the user plane route corresponding to the subslice identifier. After completion of cancelling the user plane route corresponding to the subslice, the mobility management device 122 transmits a user plane route cancellation complete notification to the cloud 140 via the API provision device 160.

Next, in step S1126, upon receiving the user plane route cancellation complete notification, the cloud 140 transmits an instruction to cancel the user plane route corresponding to the subslice and start communication using only the main slice to the user terminal 150 corresponding to the subscriber identification number received in step S1106.

Next, in step S1128, upon receiving the instruction to start communication using only the main slice, the user terminal 150 can cancel the use of the subslice to start communication using the main slice. The user terminal 150 transmits a notification indicating that the communication is started using only the main slice while cancelling the subslice to the cloud 140. In the present disclosure, the processing of step S1128 is executed using network elements of the user plane.

REFERENCE SIGNS LIST

10 System
110 Radio Access Network (RAN)
112 Base Station
122 Mobility Management Device
124 Slice Allocation Device
126 Subscriber Data Management Device
140 Cloud
150 User Terminal
160 API Provision Device
170 Client Management Device
300 Client Information
400A, 400B, 400C S-NSSAI Management Information
500 Subscriber Profile Information
600A, 600B, 600C, 600D, 600E Subscriber Network Slice Information

What is claimed is:

1. A method to be executed by an information processing apparatus in a cloud-based computing environment, the method comprising steps of:
    receiving a congestion notification including a slice identifier for a congested slice from a mobility management device;
    transmitting, to a slice allocation device, a setting request for setting a subslice to the slice corresponding to the slice identifier, upon reception of the congestion notification; and
    transmitting, when a subslice identifier associated with the slice identifier is set in the slice allocation device and the subslice identifier is added in the mobility management device, an instruction to establish communication using the subslice corresponding to the subslice identifier and the slice corresponding to the slice identifier to the mobility management device.

2. The method according to claim 1, wherein the subslice identifier is set in association with the slice identifier for the congested slice in the slice allocation device in response to the setting request for setting the subslice.

3. The method according to claim 2, further comprising a step of transmitting, when the subslice identifier is set in the slice allocation device, an addition request for adding the subslice to the mobility management device via a subscriber data management device.

4. The method according to claim 3,
    wherein the subscriber data management device manages a subscriber identification number allocated to a user terminal, a phone number associated with the subscriber identification number, and a slice list identifier allocated to the user terminal, and
    the step of transmitting the addition request for adding the subslice to the mobility management device comprises the steps of:
    transmitting, by the information processing apparatus, a first addition request for adding the subslice including the subscriber identification number to the subscriber data management device; and
    transmitting, by the subscriber data management device, a second addition request for adding the subslice including the slice list identifier corresponding to the subscriber identification number and the subscriber identification number to the mobility management device.

5. The method according to claim 4,
    wherein the slice allocation device manages the slice list identifier and one or more slice identifiers associated with the slice list identifier, and
    wherein the mobility management device obtains the subslice identifier corresponding to the slice list identifier from the slice allocation device in response to the second addition request.

6. The method according to claim 1,
    wherein the congestion notification includes a tracking area identifier for a tracking area on which a user terminal locates, and the mobility management device manages the slice identifier associated with all the user terminals locating on a subordinate tracking area, congestion information about the slice associated with the slice identifier, and a tracking area identifier associated with the user terminal, and
    when a traffic amount of the slice associated with the slice identifier allocated to the user terminal is more than or equal to a maximum threshold, the mobility management device determines that the slice being used by the user terminal is congested.

7. The method according to claim 1, further comprising a step of receiving, from the mobility management device, a traffic decrease notification including the subslice identifier associated with the deletable subslice with a traffic amount less than or equal to a minimum threshold.

8. The method according to claim 7, further comprising a step of transmitting, to a slice allocation device, a delete setting request for making a setting to delete the deletable subslice, upon reception of the traffic decrease notification.

9. The method according to claim 8, further comprising a step of transmitting the subslice delete request to the mobility management device via a subscriber data management device when deletable information about the subslice is set in the slice allocation device.

10. The method according to claim 9,
    wherein the subscriber data management device manages a subscriber identification number allocated to a user terminal, a phone number associated with the subscriber identification number, and a slice list identifier allocated to the user terminal, and
    wherein when the subscriber data management device receives a first delete request for deleting the subslice including the subscriber identification number, a second delete request for deleting a subslice including the slice list identifier corresponding to the subscriber identification number and the subscriber identification number is transmitted to the mobility management device.

11. The method according to claim 10,
wherein the slice allocation device manages the slice list identifier, one or more slice identifiers associated with the slice list identifier, the subslice identifier associated with the slice identifier, and the deletable information about the subslice identifier, and wherein the mobility management device obtains the deletable subslice identifier corresponding to the slice list identifier from the slice allocation device in response to the second delete request for deleting the subslice.

12. The method according to claim 11, further comprising a step of transmitting, when the deletable subslice identifier is deleted in the mobility management device, an instruction to establish communication using the slice corresponding to the slice identifier, except for the deletable subslice, to the mobility management device.

13. An information processing apparatus in a cloud-based computing environment, comprising:
at least one processor; and
a memory storing instructions, when the instructions are executed by the at least one processor, the at least one processor performs steps of:
receiving a congestion notification including a slice identifier for a congested slice from a mobility management device;
transmitting, to a slice allocation device, a setting request for setting a subslice to the slice corresponding to the slice identifier, upon reception of the congestion notification; and
transmitting, when a subslice identifier associated with the slice identifier is set in the slice allocation device and the subslice identifier is added in the mobility management device, an instruction to establish communication using the subslice corresponding to the subslice identifier and the slice corresponding to the slice identifier to the mobility management device.

14. A system comprising:
an information processing apparatus in a cloud-based computing environment, the information processing apparatus including at least a first processor;
a mobility management device including at least a second processor; and
a slice allocation device including at least a third processor,
wherein the first processor is configured to:
receive, from the mobility management device, a congestion notification including a slice identifier for a congested slice;
transmit, to the slice allocation device, a setting request for setting a subslice to the slice corresponding to the slice identifier, upon reception of the congestion notification; and
transmit, when the slice allocation device sets the subslice identifier associated with the slice identifier and the mobility management device adds the subslice identifier, an instruction to establish communication using the subslice corresponding to the subslice identifier and the slice corresponding to the slice identifier to the mobility management device.

* * * * *